No. 756,377. Patented April 5, 1904.

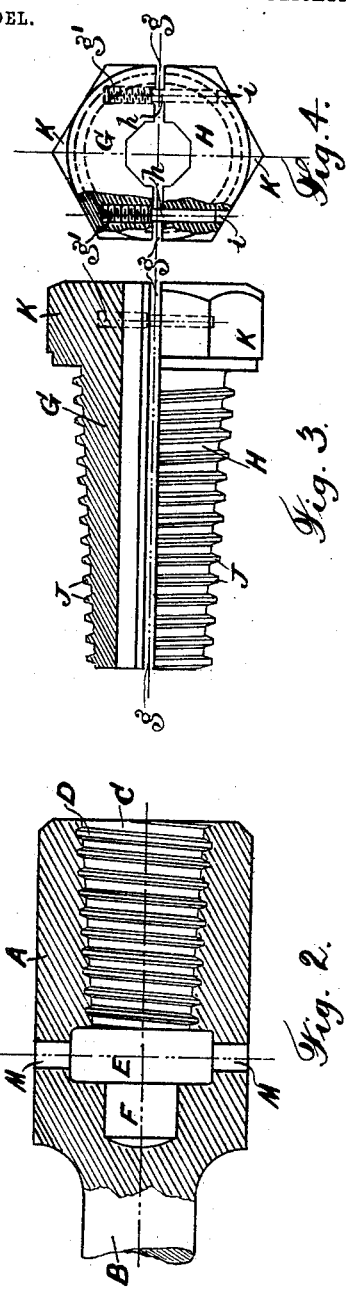

UNITED STATES PATENT OFFICE.

WALTER EDWARD KIMBER, OF JOHANNESBURG, TRANSVAAL.

CHUCK FOR ROCK-DRILLING MACHINES.

SPECIFICATION forming part of Letters Patent No. 756,377, dated April 5, 1904.

Application filed August 18, 1903. Serial No. 169,929. (No model.)

*To all whom it may concern:*

Be it known that I, WALTER EDWARD KIMBER, a subject of the King of Great Britain, residing at Johannesburg, Transvaal, have invented certain new and useful Improvements in Chucks for Rock-Drilling Machines, (for which I have made application for patent in the Transvaal, No. 299, filed July 7, 1903,) of which the following is a specification.

This invention relates to the chucks of rock-drills or rock-drilling machines, and is designed to obviate the defects of the existing forms of such devices.

By the adoption of this invention in the construction of the chuck a much more efficient appliance is obtained, one which is not so liable to get out of order, is simple and inexpensive to construct, and is easily operated by unskilled labor. It expeditiously and securely fixes the drill-bit in position and is as easily and quickly operated to remove the bit to renew the same.

The invention consists, essentially, of a device comprising a body constructed with an internally-threaded longitudinally-tapered hole in which is fitted an externally-threaded correspondingly-tapered split nut made of a plurality of independent disconnected separable parts shaped to accommodate between them the shank of the drill-bit, so that by screwing the split nut into the body the drill-bit is thereby firmly held in position.

The invention will now be described in detail by aid of the accompanying sheet of drawings, wherein—

Figure 1 represents the chuck with the drilling-bit in position therein; Fig. 2, a longitudinal section of the chuck-body. Fig. 3 represents the split nut with one-half in section, and Fig. 4 an end elevation, partly in section, of Fig. 3.

A indicates the chuck-body, which is preferably formed in one piece with and on the outer extremity of the piston-rod B of the rock-drilling machine. In the body A a longitudinally-tapered hole C is formed, which hole is tapered inward or in such a way that it is gradually restricted as it penetrates the body A. The taper hole C is cut or otherwise formed with an internal left-hand screw-thread D of a suitable pitch. In the drawings a V thread is shown; but it will be obvious that the thread may be of any other suitable shape. In the body A beyond the threaded taper hole C is formed a cylindrical recess E, exceeding in diameter the inner end of the taper hole C, and beyond the recess E an inner or further recess F is formed.

G H are the halves of a split nut, which halves are tapered externally to correspond to the taper of the hole C in the body A. Round the halves G H of the nut is cut or otherwise formed a screw-thread J, which corresponds to the internal thread D in the hole C, into which it is adapted to be screwed. The outer ends of the halves G H of the split nut are formed with a hexagonal nut or head K to allow of the split nut being rotated by means of a spanner or other suitable implement. The end of the split nut may be of any other suitable shape for the purpose. The halves G H of the nut are grooved or shaped internally to embrace or partially embrace the shank or extremity of the drilling-bit L. In the drawings (see Fig. 4) they are shown grooved to accommodate the ordinary drill-steel of octagonal section. If the extremity of the bit L, which is projected between the halves G H of the split nut, is "shanked" or rounded, the inner parallel plane faces of the halves G H will be grooved to correspond. The halves G H of the nut are so grooved that when the shank of the drill-bit L is in position between them they are maintained slightly apart, as seen at $g$ in Figs. 1, 3, and 4—that is to say, they do not meet along the inner parallel plane faces at the sides of the groove in which the shank of the bit L is secured.

In the inner plane face of the half G of the nut and at either side of the groove, and preferably at the forward end, are formed holes $g'$, which are tapped to receive one end of a screw or pin $h$. In the opposing plane face of the other half H of the nut are formed holes $i$, into which the outer extremities of the screws or pins $h$ project. By the screws or pins $h$, fixed to one-half of the nut, projecting into the coincident holes in the other half the halves G H are thereby connected and the external screw-thread J of the split nut is caused to register with the internal thread D in the taper hole C.

The drill-bit L is projected between the halves G H of the nut into the inner recess F, so that the extremity thereof abuts the body A at the bottom of the recess F.

A transverse hole M is formed through the body A and passes through the cylindrical recess E. The transverse hole M is provided for the reception of a bar or tool for holding the chuck-body A stationary while the halves G H of the nut are being screwed into it to secure the bit L.

In use it will be readily understood that the action of screwing the halves G H of the split nut into the threaded taper hole C in the body A forces the halves G H together and causes the split nut to grip the shank of the bit L and secure it within the body A.

What I claim as my invention, and desire to protect by Letters Patent, is—

1. In a rock-drill chuck, a body having an internally-threaded, longitudinally-tapered hole and a correspondingly-tapered, externally-threaded split nut, the sections of the nut being independent and separated, and means independent of the stock of said nut for holding the sections thereof in assembled relation.

2. In a rock-drill chuck, a body having an internally-threaded, longitudinally-tapered hole and a correspondingly-tapered, externally-threaded split nut, the sections of the nut being independent and separated, pins connected rigidly with one section of the nut, the other section of the nut having holes to receive said pins.

3. In a rock-drill chuck, a body having an internally-threaded, longitudinally-tapered hole and a correspondingly-tapered, externally-threaded split nut, the sections of the nut being independent and separated, and a plurality of pins tapped into one section of the nut, the other section of said nut having holes to receive said pins.

4. In a rock-drill chuck, a body having an internally-threaded, longitudinally-tapered hole, and a correspondingly-tapered, externally-threaded split nut, the sections of the nut being independent and separated, and means independent of the stock of said nut for holding the sections thereof in assembled relation, said body having means to prevent turning thereof, on the rotation of the nut.

5. In a rock-drill chuck, in combination, the body A, the longitudinally-tapered hole C and the internal screw-thread D formed therein, the recess E beyond the threaded taper hole C and the transverse hole M formed through the body A and passing through the recess E, and the inner recess F in the body A beyond the recess E, the halves G H of the split nut tapered longitudinally to correspond to the hole C in the body A and the external screw-thread J formed around the halves G H of the longitudinally-tapered split nut, the nut or head K formed on the outer extremity of the halves G H of the split nut to provide means for rotating the same, the screws or pins *h* arranged between the parallel plane faces at either side of the drill-shank L said screws or pins *h* being fixed in the inner parallel plane face of one half of the nut and projecting into coincident holes in the other half to connect the halves of the nut and to cause the external screw-thread J to register with the internal screw-thread D in the body, the grooves formed in the inner parallel plane faces to accommodate the shank of the drill in such a way that when the shank is in position between the halves G H of the nut they are maintained apart or prevented meeting along the parallel plane faces at the sides of said grooves, and the drill-shank projected between the halves G H of the split nut into the inner recess F to engage the chuck-body, at the bottom of said recess F, substantially as described.

In witness whereof I have hereunto set my hand in the presence of two subscribing witnesses.

WALTER EDWARD KIMBER.

Witnesses:
   CHAS. OVENDALE,
   R. OVENDALE.